(12) United States Patent
Greifenstein et al.

(10) Patent No.: US 7,716,938 B2
(45) Date of Patent: May 18, 2010

(54) EXTERNAL CONTROL OF A VEHICLE COOLANT PUMP WITH REMOTE HEATING OPTION

(75) Inventors: Ellen Greifenstein, Darmstadt (DE); Wolfgang Haege, Oberheimbach (DE); Dirk Wexel, Mainz (DE); Jurgen Thyroff, Harxheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 908 days.

(21) Appl. No.: 11/475,498

(22) Filed: Jun. 27, 2006

(65) Prior Publication Data
US 2007/0298296 A1    Dec. 27, 2007

(51) Int. Cl.
*F25B 27/00* (2006.01)
(52) U.S. Cl. .......................... 62/236; 62/133
(58) Field of Classification Search ............ 62/236, 62/133; 180/65.31, 68.1
See application file for complete search history.

(56) References Cited

U.S. PATENT DOCUMENTS

| | | | |
|---|---|---|---|
| 5,301,515 A * | 4/1994 | Iritani et al. | 62/126 |
| 6,886,358 B2 * | 5/2005 | Hille et al. | 62/244 |
| 6,925,826 B2 * | 8/2005 | Hille et al. | 62/244 |
| 7,028,795 B2 * | 4/2006 | Tabata | 180/65.21 |
| 7,032,393 B2 * | 4/2006 | Tamai et al. | 62/115 |
| 7,273,120 B2 * | 9/2007 | Tabata | 180/65.265 |

* cited by examiner

*Primary Examiner*—Melvin Jones
(74) *Attorney, Agent, or Firm*—John A. Miller; Miller IP Goup, PLC

(57) ABSTRACT

A system and method for operating a cooling fluid pump and cooling fluid heater in a vehicle when the vehicle is not being used so that the temperature of the cooling fluid does not drop to low in a cold environment. The system includes an AC connector for plugging the system into an AC power outlet. The system also includes AC/DC converter that converts the AC power to a DC signal suitable to operate the pump. The system also includes a temperature switch that closes if the ambient temperature falls below a predetermined temperature, which electrically connects the AC connector to the AC/DC converter. When the AC/DC converter is powered, a switch is closed to connect the pump to a pulse width modulation (PWM) generator to operate the pump. Further, when the temperature switch is closed, power is provided to the heater.

19 Claims, 2 Drawing Sheets

EXTERNAL CONTROL OF A VEHICLE COOLANT PUMP WITH REMOTE HEATING OPTION

BACKGROUND OF THE INVENTION

1. Field of the Invention

This invention relates generally to a system and method for operating a cooling fluid pump in a vehicle when the vehicle is not being used and, more particularly, to a system and method for operating a cooling fluid pump and heater that heats the cooling fluid pumped by the pump in a fuel cell or electrical hybrid vehicle when the vehicle is not being used.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. A PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and membrane define a membrane electrode assembly (MEA). MEAs are relatively expensive to manufacture and require certain conditions for effective operation.

Many fuel cells are typically combined in a fuel cell stack to generate the desired power. The fuel cell stack receives a cathode input gas, typically a flow of air forced through the stack by a compressor. Not all of the oxygen in the air is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

It is necessary that a fuel cell operate at an optimum relative humidity and temperature to provide efficient stack operation and durability. The temperature provides the relative humidity for the fuel cells in the stack for a particular stack pressure. Excessive stack temperature above the optimum temperature may damage fuel cell components, reducing the lifetime of the fuel cells. Also, stack temperatures below the optimum temperature reduces the stack performance.

Fuel cell systems employ thermal sub-systems that control the temperature within the fuel cell stack. Particularly, a cooling fluid is pumped through the cooling channels in the bipolar plates in the stack. Typically the cooling fluid is a liquid that inhibits corrosion within the stack, does not freeze in cold environments, and is non-conductive. One example of a suitable cooling fluid is a de-ionized water and glycol mixture. It is necessary that the cooling fluid be non-conductive so that current does not travel across the cooling fluid channels in the stack.

At cold system start-up before the fuel cell stack has reached its desired operating temperature, the stack is generally unable to produce enough power to operate the vehicle. Therefore, the vehicle operator must wait a certain period of time until the fuel cell stack reaches its operating temperature as a result of stack inefficiencies before demanding significant load for operating the vehicle. For sub-zero system start-ups, the fuel cell stack may take a significant period of time to reach its operating temperature at which time it is able to provide power to operate the vehicle.

In sub-zero environments, water in the fuel cell stack and other system components, such as pipes and hoses, may freeze. It is known in the art to heat the cooling fluid and other structures in a fuel cell system using electrical heaters before and during cold system start-up to improve the system start-up time. It would be desirable to provide a system that prevented the fuel cell stack and related components from freezing during those time that the fuel cell vehicle is not being operated.

SUMMARY OF THE INVENTION

In accordance with the teachings of the present invention, a system and method are disclosed for operating a cooling fluid pump and cooling fluid heater in a vehicle when the vehicle is not being operated, so that the temperature of the cooling fluid and fuel cell stack does not drop below zero to prevent water in the system components from freezing and to reduce system start-up time in a cold environment. The system includes an AC connector for plugging the system into an AC power outlet. The system also includes an AC/DC converter that converts the AC power to a DC signal and power suitable to operate the pump. The system also includes a temperature switch that closes if the temperature falls below a predetermined temperature, which electrically connects the AC connector to the AC/DC converter. When the AC/DC converter is powered, a switch is closed to connect the pump to a pulse width modulation (PWM) generator to operate the pump. Further, when the temperature switch is closed, power is provided to the heater.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a control system for pumping a cooling fluid and heating the cooling fluid in a vehicle when the vehicle is not being operated is merely exemplary in nature, and is in no way intended to limit the invention or its applications or uses. For example, the control system described below has particular application for a fuel cell vehicle. However, the control system of the invention may have application for other types of vehicles, such as electrical hybrid vehicles.

Figure 1:
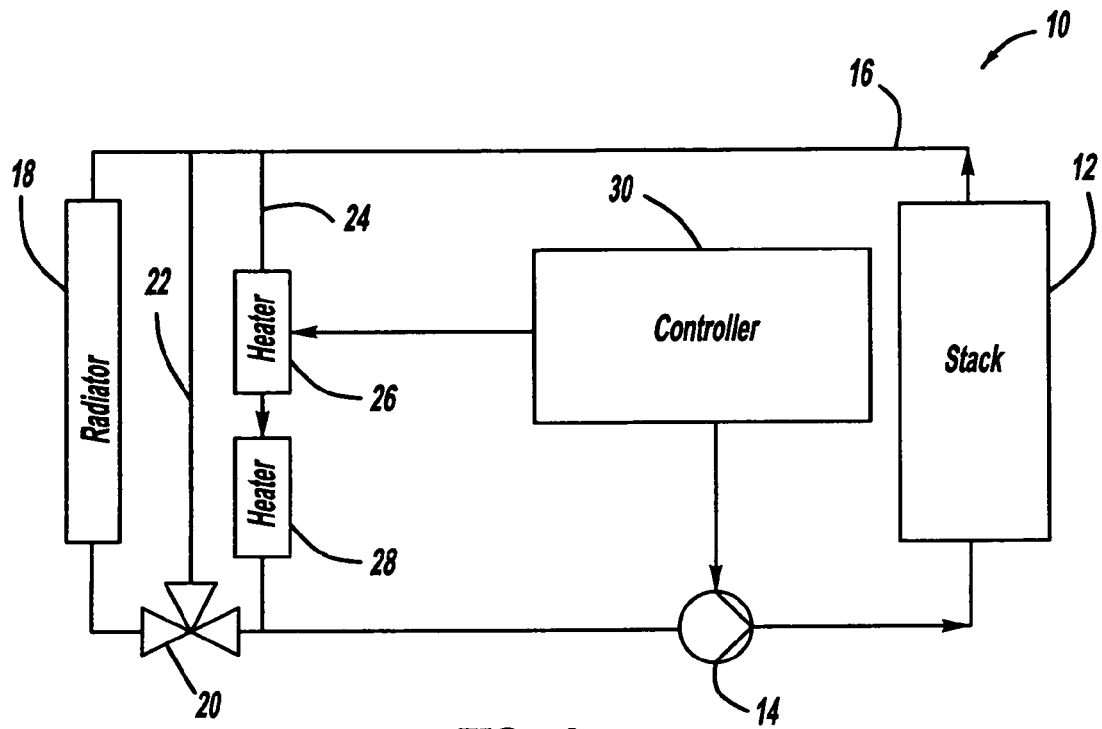
FIG. 1 is a schematic block diagram of a fuel cell system that includes a controller for operating a cooling fluid pump and cooling fluid heater when the fuel cell system is not being operated, according to an embodiment of the present invention.

FIG. 1 is a schematic block diagram of a fuel cell system 10 including a fuel cell stack 12. A pump 14 pumps a cooling fluid through a coolant loop 16 and cooling fluid flow channels in the stack 12 to maintain the stack 12 at a desirable operating temperature, such as 80° C. The speed of the pump 14 is selected depending on the ambient temperature, the output power of the stack 12 and other factors. The cooling fluid flowing through the coolant loop 16 is sent through a radiator 18 where it is cooled to be returned to the stack 12. A by-pass valve 20 allows the cooling fluid to by-pass the radiator 18 on by-pass line 22 for those times when it is desirable not to reduce the temperature of the cooling fluid, such as at system start-up. The by-pass valve 20 can be controlled to provide some of the cooling to the radiator 18 and some of the cooling fluid to the by-pass line 22. The by-pass valve 20 can also be selectively controlled so that the cooling fluid flows through line 24 to be heated by an electrical heater 26, for example, to heat the cooling fluid for cold system start-up. The heater 26 can be any heater suitable for the purposes described herein, such as an electrical wire wrapped around a cooling fluid hose or heater rod. The heated cooling fluid is also used to power a cabin heater 28 to heat the passenger compartment of the vehicle and provide windscreen defrosting. An additional valve (not shown) can be provided in the line 24 before the heater 26 for control purposes during normal vehicle operation.

According to the invention, a controller 30 controls the operation of the heater 26 and the pump 14 during low temperature conditions when the fuel cell system 10 is not operating. As will be discussed in detail below, the controller 30 is electrically coupled to an external power supply and turns on the heater 26 and the pump 14 if the temperature drops below a predetermined temperature, such as 0° C. Therefore, when the fuel cell system 10 is started, the temperature of the cooling fluid and the temperature of the stack 12 are not cold, and thus the stack 12 can reach its optimal operating temperature more quickly.

Figure 2:
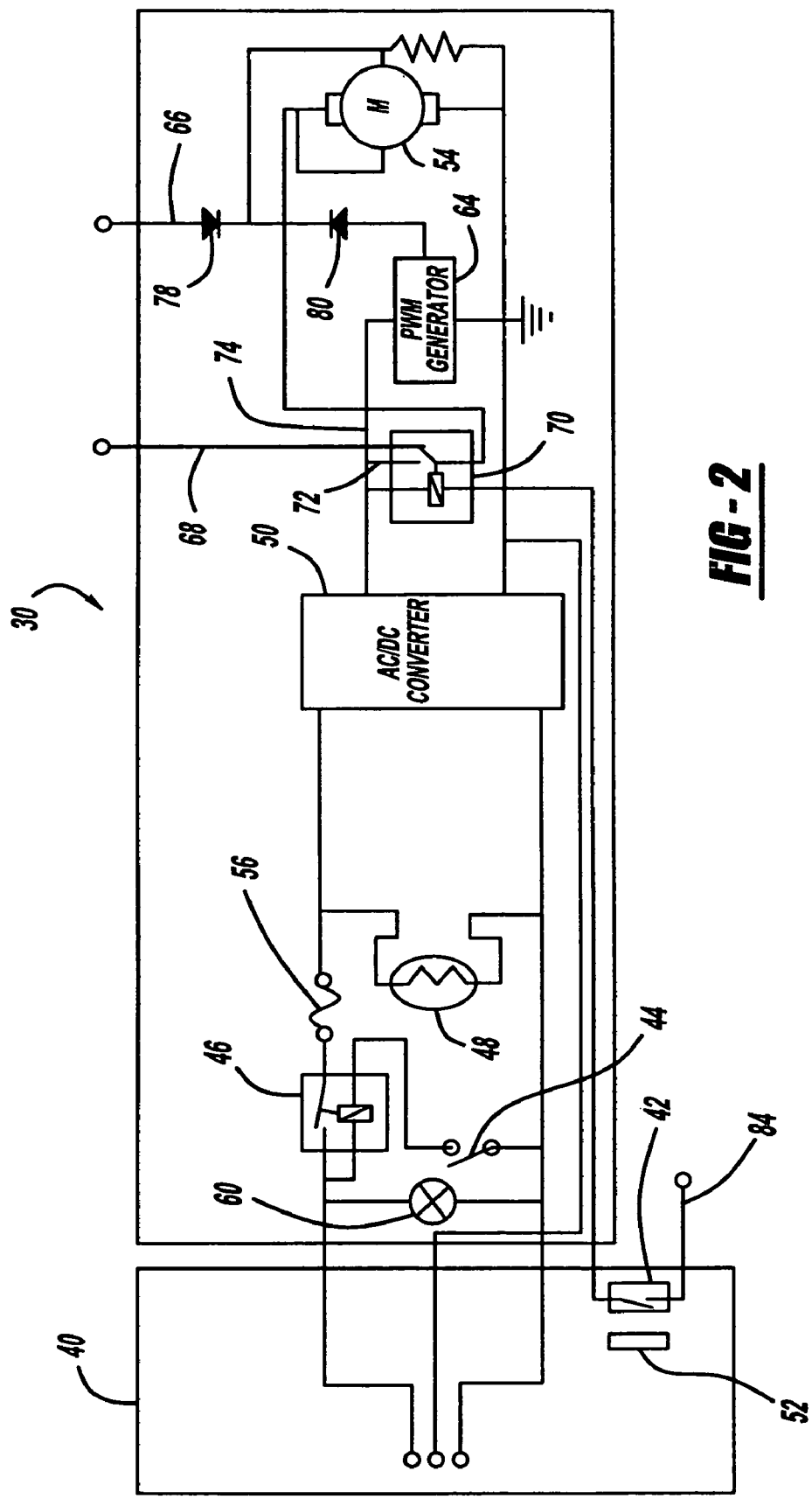
FIG. 2 is a schematic diagram of the controller shown in FIG. 1.

FIG. 2 is a schematic diagram of the controller 30. The controller 30 includes a male AC connector 40 that is connected to a power cable (not shown). The power cable is connected to an AC wall outlet to provide the AC power. The AC connector 40 includes a Reed switch 42 and associated magnet 52 that provides drive-away protection by preventing the fuel cell system 10 from operating if the connector 40 is plugged into the AC outlet. Particularly, if the connector 40 is plugged into the AC outlet, the Reed switch 42 is closed by the magnet 52, which provides a signal to a vehicle controller (not shown) on line 84 that prevents the fuel cell system from starting up.

The controller 30 includes a temperature switch 44 that is calibrated for a predetermined temperature, such as 0° C. The temperature switch 44 can be positioned to measure the temperature at any desirable location, such as ambient temperature, cooling fluid temperature, stack temperature, etc. Alternatively, the temperature switch 44 can be replaced with a temperature sensor and switch combination. If the temperature falls below the predetermined temperature, then the temperature switch 44 closes which activates a solenoid switch 46 to provide power to a heater 48, which represents the heater 26. Additionally, the solenoid switch 46 provides AC power to an AC/DC converter 50 that converts the AC power to DC power suitable for a motor 54 that operates the pump 14. In one embodiment, the motor 54 operates on 42 volts DC, however, this is by way of a non-limiting example. A high temperature fuse 56 is connected between the solenoid 46 and the AC/DC convert 50 that disconnects the controller 30 if the temperature gets to high, such as above 100° C. Also, a lamp 60 is electrically coupled to the connector 40 and provides an indicator light that the controller 30 is powered even if the temperature switch 44 is not closed.

During normal fuel cell operation, the motor 54 receives power on line 68 from a suitable DC voltage source on the vehicle. The speed of the motor 54 is controlled by a control signal from the vehicle controller on line 66. A solenoid switch 70 determines whether the motor 54 is connected to the line 68 or to the AC/DC converter 50. Particularly, when the temperature switch 44 is open, no power is provided to the converter 50 and the solenoid switch 70 is in its un-energized state where the motor 54 is connected to the line 68 for normal fuel cell system operation. However, when the converter 50 provides the DC output signal, the solenoid switch 70 is energized and switched, causing the motor 54 to be powered by the converter 50 through line 72. Also, the DC signal from the converter 50 powers a PWM generator 64 that controls the speed of the motor on line 74. A diode 78 prevents the signal from the generator 64 from going to the vehicle controller, and a diode 80 prevents the signal from the vehicle controller from going to the generator 64.

Figure 3:
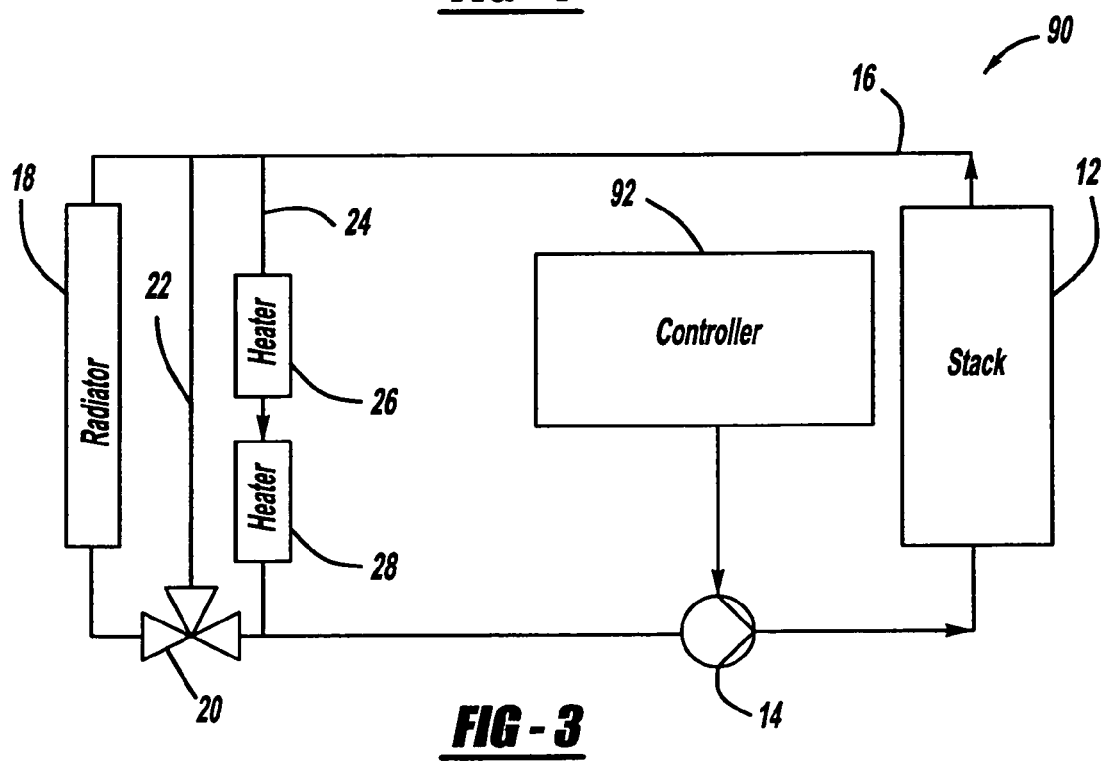
FIG. 3 is a schematic block diagram of a fuel cell system employing a controller that controls the cooling fluid pump for degassing purposes when the cooling fluid loop is being serviced or filled.

FIG. 3 is a schematic block diagram of a fuel cell system 90 similar to the fuel cell system 10, where like elements are identified by the same reference numeral. In this embodiment, the controller 30 is replaced with a controller 92 that does not control the heater 26. Particularly, this embodiment is used for cooling fluid degassing during cooling fluid system service. A reservoir (not shown) is typically provided in the thermal sub-system that provides a source of the cooling fluid to the coolant loop 16. The reservoir includes a fill cap where the cooling fluid can be replaced if it falls below a predetermined level. When the cap is removed and the cooling fluid is poured into the reservoir, it is desirable to provide coolant loop degassing to remove air bubbles from the coolant loop and the fuel cell stack 12 that may interfere with normal operation of the system 90, such as stack hot spots. Therefore, the controller 92 can be used to operate the pump 14 during the service to provide the degassing. The controller 92 would be similar to the controller 30 except the switch 44 and the heater 48 can be removed. Therefore, when the connector 40 is plugged into the AC outlet, the power from the AC/DC converter 50 will disconnect the pump from the vehicle power supply and connect it to the external power supply to operate the motor 54 as discussed above.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A control system for a vehicle, said system comprising:
a coolant loop;
a pump for pumping a cooling fluid through the coolant loop;
a heater for heating the cooling fluid being pumped through the coolant loop; and
a controller for controlling the heater and the pump, said controller including a connector for accepting a plug for an AC power source, a temperature switch that closes in response to a predetermined temperature, a first control switch for providing AC power to the controller and the heater when the temperature switch is closed, an AC/DC converter responsive to the AC power and converting it to a DC signal when the first control switch is closed, and a second control switch responsive to the DC signal and switching a power signal to the pump from a vehicle power line to the DC signal.

2. The system according to claim 1 wherein the controller further includes a PWM generator, said PWM generator being powered by the DC signal when the second control switch is closed, said generator providing a control signal to the pump.

3. The system according to claim 1 further comprising a drive-away protection switch, said drive-away protection switch preventing the vehicle from operating if the connector is plugged into the AC power source.

4. The system according to claim 3 wherein the drive-away protection switch is positioned in the connector.

5. The system according to claim 4 wherein the drive-away protection switch is a Reed switch including a magnet.

6. The system according to claim 1 wherein the first and second control switches are solenoid switches.

7. The system according to claim 1 wherein the heater is an electrical heater.

8. The system according to claim 1 wherein the system is on a fuel cell vehicle or an electrical hybrid vehicle.

9. A control system for a fuel cell vehicle or an electrical hybrid vehicle, said system comprising:
a coolant loop;
a pump for pumping a cooling fluid through the coolant loop;
a heater for heating the cooling fluid being pumped through the coolant loop; and
a controller for controlling the heater and the pump, said controller including a connector for accepting a plug for an AC power source and a temperature switch that closes in response to a predetermined temperature, said controller further including a first control switch for providing AC power to the controller and the heater when the temperature switch is closed and an AC/DC converter responsive to the AC power and converting it to a DC signal when the first control switch is closed, said controller further including a second control switch responsive to the DC signal and switching a power signal to the pump from a vehicle power line to the DC signal, said controller further including a PWM generator being powered by the DC signal when the second switch is closed, said generator providing a control signal to the pump, said controller further including a drive-away protection switch for preventing the vehicle from operating if the connector is plugged into the AC power source.

10. The system according to claim 9 wherein the drive-away protection switch is positioned in the connector.

11. The system according to claim 10 wherein the drive-away protection switch is a Reed switch including a magnet.

12. The system according to claim 9 wherein the first and second control switches are solenoid switches.

13. The system according to claim 9 wherein the heater is an electrical heater.

14. A control system for a vehicle, said system comprising:
a coolant loop;
a pump for pumping a cooling fluid through the coolant loop; and
a controller for controlling the pump, said controller including a connector for accepting a plug for an AC power source, an AC/DC converter responsive to the AC power and converting it to a DC signal when the connector is connected to the power source, and a control switch responsive to the DC signal and switching a power signal to the pump from a vehicle power line to the DC signal; and
a drive-away protection switch, said drive-away protection switch preventing the vehicle from operating if the connector is plugged into the AC power source.

15. The system according to claim 14 wherein the controller further includes a PWM generator, said PWM generator being powered by the DC signal when the control switch is closed, said generator providing a control signal to the pump.

16. The system according to claim 14 wherein the drive-away protection switch is positioned in the connector.

17. The system according to claim 16 wherein the drive-away protection switch is a Reed switch including a magnet.

18. The system according to claim 14 wherein the control switch is a solenoid switch.

19. The system according to claim 14 wherein the system is on a fuel cell vehicle or an electrical hybrid vehicle.

* * * * *